US012707232B2

(12) United States Patent
Pateromichelakis et al.

(10) Patent No.: US 12,707,232 B2
(45) Date of Patent: Aug. 11, 2026

(54) MAPPING APPLICATIONS AND LOCATION SERVICE PROFILES

(71) Applicant: Lenovo (Singapore) Pte. Ltd., New Tech Park (SG)

(72) Inventors: Emmanouil Pateromichelakis, Viersen (DE); Robin Thomas, Bad Nauheim (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 358 days.

(21) Appl. No.: 18/684,378

(22) PCT Filed: Sep. 28, 2021

(86) PCT No.: PCT/EP2021/076707

§ 371 (c)(1),
(2) Date: Feb. 16, 2024

(87) PCT Pub. No.: WO2023/020708

PCT Pub. Date: Feb. 23, 2023

(65) Prior Publication Data

US 2025/0150783 A1 May 8, 2025

(30) Foreign Application Priority Data

Aug. 18, 2021 (GR) .............................. 20210100558

(51) Int. Cl.
*H04W 4/02* (2018.01)
*H04L 67/30* (2022.01)
*H04W 4/50* (2018.01)

(52) U.S. Cl.
CPC ............. *H04W 4/025* (2013.01); *H04L 67/30* (2013.01)

(58) Field of Classification Search
CPC ............................... H04W 4/025; H04L 67/30
(Continued)

(56) References Cited

U.S. PATENT DOCUMENTS

2004/0198385 A1 10/2004 Wheeler et al.
2005/0003829 A1 * 1/2005 Lala ...................... H04W 4/029 455/456.1
(Continued)

FOREIGN PATENT DOCUMENTS

JP 2016509409 A 3/2016
JP 2018105637 A 7/2018
WO 2020199899 A1 10/2020

OTHER PUBLICATIONS

CATT, "Discussion for new work on location service", 3GPP TSG-SA WG6 Meeting #42-bis-e S6-210846, Apr. 12-20, 2021. pp. 1-7.
(Continued)

*Primary Examiner* — Mark G. Pannell
(74) *Attorney, Agent, or Firm* — Kunzler Needham & Hilton; Bruce R. Needham

(57) ABSTRACT

Apparatuses, methods, and systems are disclosed for mapping applications and location service profiles. One method includes configuring location service profiles. Each location service profile includes at least one positioning method, at least one quality of service parameter, at least one mapping to at least one location service producer, at least one application service type, and/or at least one service area type. The method includes receiving a location request from a location service consumer. The method includes determining a first mapping of at least one application to a first location service profile of the location service profiles based on the location request. The method includes transmitting the first mapping and the first location service profile to the at least one location service producer. The method includes determining a fused location estimate for the first location service profile.

20 Claims, 9 Drawing Sheets

(58) Field of Classification Search
USPC .................................................... 455/456.1
See application file for complete search history.

(56) References Cited

U.S. PATENT DOCUMENTS

| | | | | |
|---|---|---|---|---|
| 2006/0099960 | A1* | 5/2006 | Duan | H04W 8/10<br>455/456.2 |
| 2018/0302891 | A1* | 10/2018 | Bitra | H04W 64/00 |
| 2020/0178038 | A1* | 6/2020 | Wang | G01S 5/02 |
| 2020/0252230 | A1* | 8/2020 | Shoemaker | H04L 12/2818 |
| 2021/0266708 | A1* | 8/2021 | Wang | H04W 4/023 |
| 2021/0410102 | A1* | 12/2021 | Manolakos | H04W 4/02 |
| 2023/0309054 | A1* | 9/2023 | Zhou | H04W 4/02 |

OTHER PUBLICATIONS

Lenovo, Motorola Mobility, "Solution on KI #4—support for fused location service enablement", 3GPP TSG-SA WG6 Meeting #46-e S6-212675, Nov. 15-23, 2021, pp. 1-4.

PCT/EP2021/076707, "Notification of Transmittal of the International Search Report and the Written Opinion of the International Searching Authority, or the Declaration", International Searching Authority, May 19, 2022, pp. 1-19.

R. Filjar et al., "LBS Position Estimation by Adaptive Selection of Positioning Sensors Based on Requested QoS", Next Generation Teletraffic and Wired/Wireless Advanced Networking; [Lecture Notes in Computer Science], Springer Berlin Heidelberg, Sep. 3, 2008, pp. 1-9.

CATT, "New SID on study on 5G-enabled fused location service capability exposure", 3GPP TSG-SA WG6 Meeting #42-bis-e S6-210975, Apr. 12-20, 2021, pp. 1-3.

Lenovo et al., "Key Issue on support for hybrid positioning and location fusion", 3GPP TSG-SA WG6 Meeting #45 S6-212086, Aug. 25-Sep. 3, 2021, pp. 1-2.

3GPP, "3rd Generation Partnership Project; Technical Specification Group Services and System Aspects; Study on 5G-enabled fused location service capability exposure; (Release 18)", 3GPP TR 23.700-96 V0.1.1, Jul. 2021, pp. 1-10.

3GPP, "3rd Generation Partnership Project; Technical Specification Group Services and System Aspects; Location Services (LCS); Service description; Stage 1 (Release 16)", 3GPP TS 22.071 V16.0.0, Jul. 2020, pp. 1-55.

3GPP, "3rd Generation Partnership Project; Technical Specification Group Services and System Aspects; Service requirements for the 5G system; Stage 1 (Release 18)", 3GPP TS 22.261 V18.3.0, Jun. 2021, pp. 1-91.

3GPP, "3rd Generation Partnership Project; Technical Specification Group Services and System Aspects; Functional architecture and information flows to support Common API Framework for 3GPP Northbound APIs; Stage 2 (Release 17)", 3GPP TS 23.222 V17.5.0, Jun. 2021, pp. 1-118.

3GPP, "3rd Generation Partnership Project; Technical Specification Group Services and System Aspects; 5G System (5GS) Location Services (LCS); Stage 2 (Release 17)", 3GPP TS 23.273 V17.1.0, Jun. 2021, pp. 1-99.

3GPP, "3rd Generation Partnership Project; Technical Specification Group Services and System Aspects; Service Enabler Architecture Layer for Verticals (SEAL); Functional architecture and information flows; (Release 17)", 3GPP TS 23.434 V17.2.0, Jun. 2021, pp. 1-165.

3GPP, "3rd Generation Partnership Project; Technical Specification Group Services and System Aspects; Architecture for enabling Edge Applications; (Release 17)", 3GPP TS 23.558 V17.0.0, Jun. 2021, pp. 1-157.

3GPP, "3rd Generation Partnership Project; Technical Specification Group Radio Access Network; Evolved Universal Terrestrial Radio Access (E-UTRA); Physical channels and modulation (Release 16)", 3GPP TS 36.211 V16.6.0, Jun. 2021, pp. 1-249.

3GPP, "3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.5.0, Jun. 2021, pp. 1-120.

3GPP, "3rd Generation Partnership Project; Technical Specification Group Services and System Aspects; Service requirements for cyber-physical control applications in vertical domains; Stage 1 (Release 18)", 3GPP TS 22.104 V18.1.0, Jun. 2021, pp. 1-81.

3GPP, "3rd Generation Partnership Project; Technical Specification Group Services and System Aspects; System architecture for the 5G System (5GS); Stage 2 (Release 17)", 3GPP TS 23.501 V17.1.0, Jun. 2021, pp. 1-526.

* cited by examiner

MAPPING APPLICATIONS AND LOCATION SERVICE PROFILES

FIELD

The subject matter disclosed herein relates generally to wireless communications and more particularly relates to mapping applications and location service profiles.

BACKGROUND

In certain wireless communications networks, location service profiles may be used to assist in location services. Location services may not function properly if not properly configured.

BRIEF SUMMARY

Methods for mapping applications and location service profiles are disclosed. Apparatuses and systems also perform the functions of the methods. One embodiment of a method at a location service enabler includes configuring a plurality of location service profiles. Each location service profile of the plurality of location service profiles includes at least one positioning method, at least one quality of service parameter, at least one mapping to at least one location service producer, at least one application service type, at least one service area type, or a combination thereof. In some embodiments, the method includes receiving a location request from a location service consumer. In certain embodiments, the method includes determining a first mapping of at least one application of at least one user equipment to a first location service profile of the plurality of location service profiles based on the location request. In various embodiments, the method includes transmitting the first mapping and the first location service profile to the at least one location service producer. In some embodiments, the method includes determining a fused location estimate for the first location service profile.

One apparatus for mapping applications and location service profiles includes a location service enabler. In some embodiments, the apparatus includes a processor that configures a plurality of location service profiles. Each location service profile of the plurality of location service profiles includes at least one positioning method, at least one quality of service parameter, at least one mapping to at least one location service producer, at least one application service type, at least one service area type, or a combination thereof. In various embodiments, the apparatus includes a receiver that receives a location request from a location service consumer. The processor determines a first mapping of at least one application of at least one user equipment to a first location service profile of the plurality of location service profiles based on the location request. In some embodiments, the apparatus includes a transmitter that transmits the first mapping and the first location service profile to the at least one location service producer. In certain embodiments, the processor determines a fused location estimate for the first location service profile.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
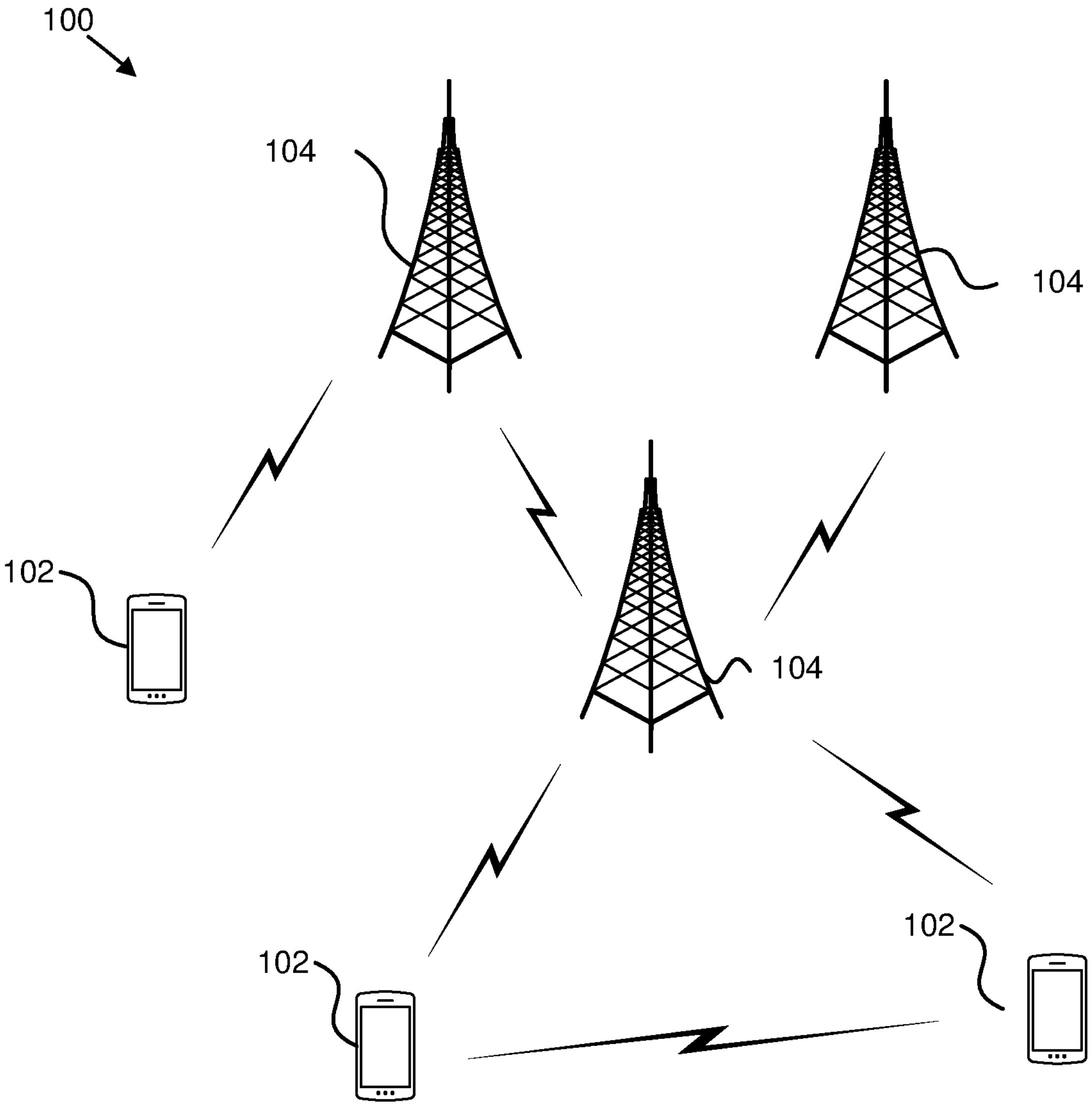
FIG. 1 is a schematic block diagram illustrating one embodiment of a wireless communication system for mapping applications and location service profiles.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for mapping applications and location service profiles. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), an application function, a Service Enabler Architecture Layer (SEAL) function, a vertical application enabler server, an edge enabler server, an edge configuration server, a mobile edge computing platform function, a mobile edge computing application, a middleware entity, a location enabler server, a location server, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In certain embodiments, a network unit 104 may configure a plurality of location service profiles. Each location service profile of the plurality of location service profiles includes at least one positioning method, at least one quality of service parameter, at least one mapping to at least one location service producer, at least one application service type, at least one service area type, or a combination thereof. In some embodiments, the network unit 104 may receive a location request from a location service consumer. In certain embodiments, the network unit 104 may determine a first mapping of at least one application of at least one user equipment to a first location service profile of the plurality of location service profiles based on the location request. In various embodiments, the network unit 104 may transmit the first mapping and the first location service profile to the at least one location service producer. In some embodiments, the network unit 104 may determine a fused location estimate for the first location service profile. Accordingly, the network unit 104 may be used for mapping applications and location service profiles.

Figure 2:
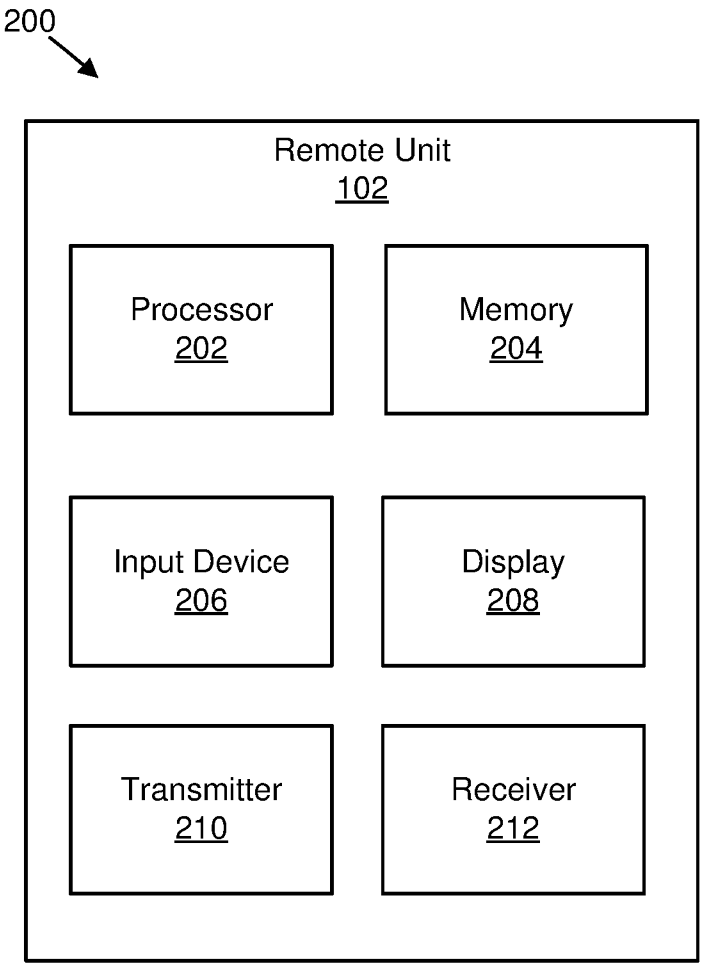
FIG. 2 is a schematic block diagram illustrating one embodiment of an apparatus that may be used for mapping applications and location service profiles.

FIG. 2 depicts one embodiment of an apparatus 200 that may be used for mapping applications and location service profiles. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
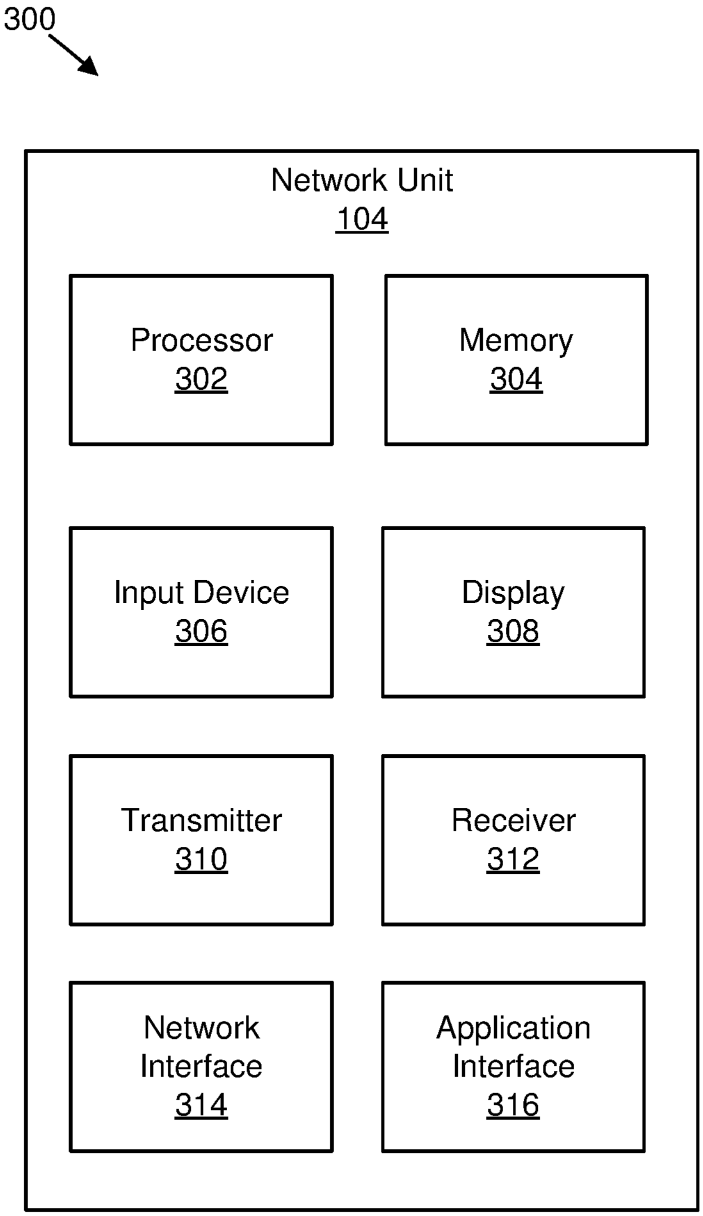
FIG. 3 is a schematic block diagram illustrating one embodiment of an apparatus that may be used for mapping applications and location service profiles.

FIG. 3 depicts one embodiment of an apparatus 300 that may be used for mapping applications and location service profiles. The apparatus 300 includes one embodiment of the network unit 104. Furthermore, the network unit 104 may include a processor 302, a memory 304, an input device 306, a display 308, a transmitter 310, a receiver 312, a network interface 314 (e.g., for communicating with network devices), and an application interface 316 (e.g., for communication with applications). As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the processor 302 configures a plurality of location service profiles. Each location service profile of the plurality of location service profiles includes at least one positioning method, at least one quality of service parameter, at least one mapping to at least one location service producer, at least one application service type, at least one service area type, or a combination thereof. In various embodiments, the receiver 312 receives a location request from a location service consumer. The processor 302 determines a first mapping of at least one application of at least one user equipment to a first location service profile of the plurality of location service profiles based on the location request. In some embodiments, the transmitter 310 transmits the first mapping and the first location service profile to the at least one location service producer. In certain embodiments, the processor 302 determines a fused location estimate for the first location service profile.

In certain embodiments, location services ("LCS") are part of a third generation partnership program ("3GPP") architecture and radio access network ("RAN") framework to enable identification and standardized reporting of a user equipment's ("UE's") and/or group of UEs location information. The location information may be exposed to the user, mobile equipment ("ME"), network operator, service provider, value added service providers, and for public land mobile network ("PLMN") internal operations. In some embodiments, a LCS framework may be used for all different types of location information.

In various embodiments, a location application programming interface ("API") may be provided to a vertical device that may have completely different network ("NW") handling abilities and requirements for different scenarios. Different API exposure for different configurations may use additional signalling and/or complexity at the network or application side to provide a required quality of service ("QoS").

In certain embodiments, location exposure may be performed based on different vertical needs (e.g., which may dynamically change over time and area) without imposing additional complexity to vertical applications.

In some embodiments, a mobile network operator ("MNO") and/or third party service provider ("SP") may dynamically offer customized value-added location services (e.g., location augmentation, location prediction) as APIs to improve vertical user experience and/or vertical server awareness.

In various embodiments, positioning methods may be integrated and negotiated if there are a mixture of non-3GPP and 3GPP positioning methods.

In certain embodiments, location services may be dynamically provided in edge and/or mobile edge computing ("MEC") environments with minimum complexity and/or signaling, and a mixture of positioning methods.

In some embodiments, off-network location support for verticals may be efficiently handled (e.g., UE to UE ("PC5") communication may be used for some out of coverage scenarios; however, if we assume licensed resources and multi-operator vertical services, location reporting may be done by a NW and/or middleware).

In various embodiments, there may be a variety of use cases, verticals, scenarios and application services (e.g., vehicle to everything ("V2X"), industrial internet of things ("IIoT"), unmanned aerial system ("UAS")) that use LCS in addition to data communications that may increase a complexity of the LCS framework and corresponding interactions between 3GPP and non-3GPP entities. Location-related key performance indicators ("KPIs") of the various use cases may require varying levels of accuracy (e.g., horizontal, vertical, two-dimensional ("2D"), three-dimensional ("3D")), and to different location fix latency requirements, availability requirements, speed, and/or heading.

In certain embodiments, there may be a unified framework using a LCS profile that takes into account a set of attributes to satisfy specific requirements of use cases and/or application services across MNOs, verticals, and 3rd party operators. The LCS profile solution may include: 1) the configuration and signaling of the LCS profile; and/or 2) use of a middleware for translating a location request from a vertical application to the LCS profile and providing value added services for verticals.

In some embodiments, handling API invocation from a vertical customer and matching to northbound APIs per LCS profile may enable ease of vertical integration to a fifth generation system ("5GS") and enable time faster location reporting (e.g., one location API may be offered to a vertical; however, multiple LCS profiles (e.g., which may be "hidden" to a customer) may be negotiated and consumed by a middleware).

In various embodiments, location services are one type of services that can be provided by a mobile communication system. The location-based services may serve certain vertical industries or may be provided for target applications.

In certain embodiments, location-based services may include: emergency services, emergency alert services, person tracking, fleet management, asset management, traffic congestion reporting, roadside assistance, routing to nearest commercial enterprise, traffic and public transportation information, city sightseeing, localized advertising, mobile yellow pages, weather, and/or asset and service finding.

In some embodiments, a LCS session associated with an LCS profile may be defined and configured and may be done with minimum exposure to a third party and/or customer. Without such embodiments, an application server may need to consolidate all measurements and interact with different systems to get a required location. The LCS profile may help to optimize location determination based on an environment, UE context, and may facilitate profile checking and/or monitoring.

In various embodiments, steps to define and/or configure an LCS profile may include translation of a vertical request to a LCS profile and may derive a requested location report. In certain embodiments, a location service enabler ("LSE") server and/or device may fetch location reports in an iterative manner and/or based on priorities to facilitate a vertical requirement being met with minimum signaling and/or complexity.

Figure 4:
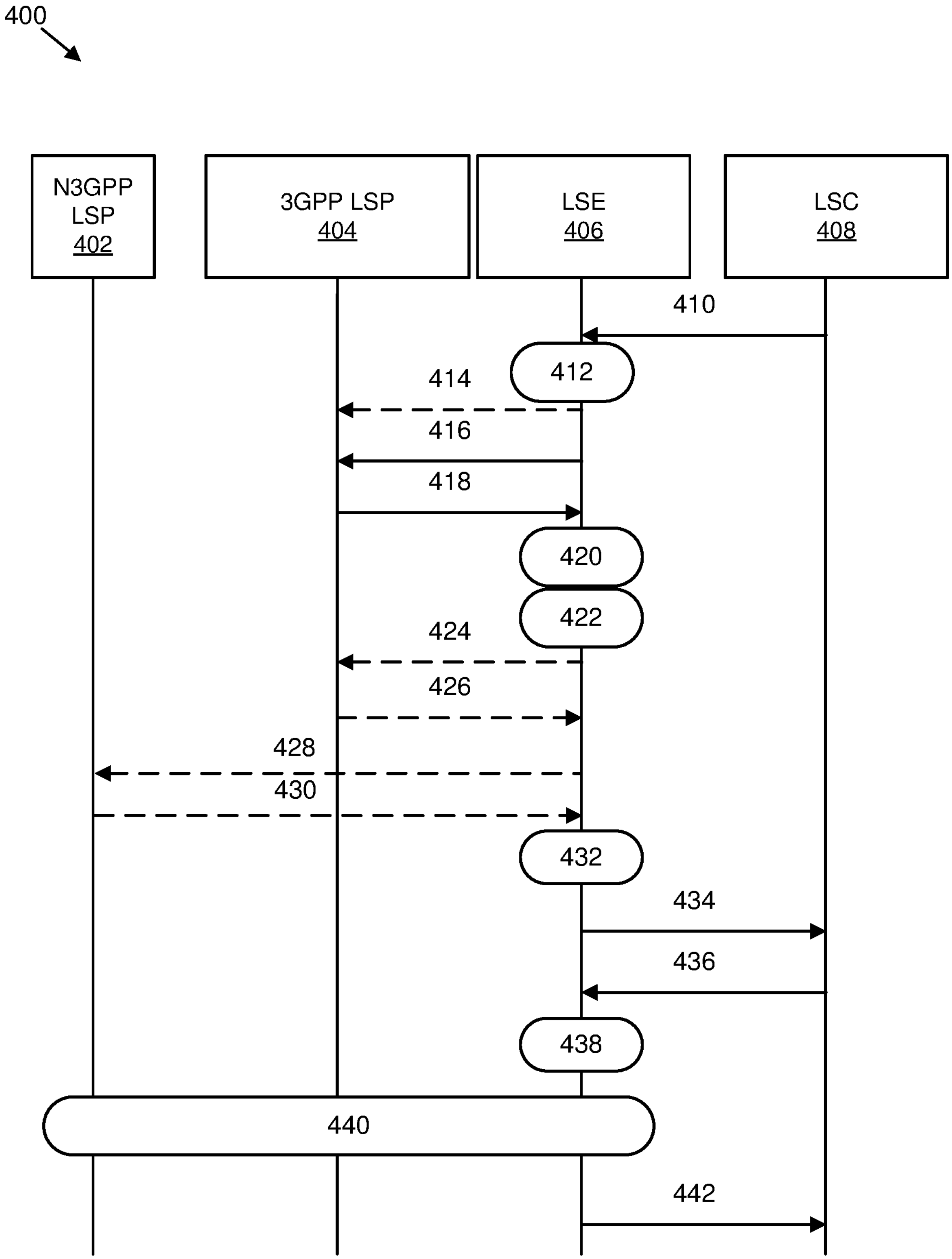
FIG. 4 is a block diagram illustrating one embodiment of a system for application to LCS profile mapping.

FIG. 4 is a block diagram illustrating one embodiment of a system 400 for application to LCS profile mapping. The system 400 includes a non-3GPP ("N3GPP") location service producer ("LSP") 402, a 3GPP LSP 404 (e.g., 3GPP-based LSP, location management function ("LMF"), radio access network ("RAN"), service enabler application layer ("SEAL")), a location service enabler ("LSE") 406 (and/or middleware), and a location service consumer ("LSC") 408 (e.g., vertical application, application function ("AF")). As may be appreciated, any of the communications described herein may include one or more messages. It should be noted that a location service consumer may be a UE or a group of UEs within a service area.

Steps 410 through 434 describe initial mapping and translation, and steps 436 through 442 provide re-mapping due to an application change and/or monitoring.

In a first communication 410, the LSE 406 receives a new location request from the LSC 408 (e.g., vertical application). The location request may include a requirement about a location granularity, reporting, a response time, an end-to-end positioning latency (e.g., time to first fix), and so forth.

The LSE 406 maps 412 an application identifier ("ID") (e.g., vertical application layer ("VAL") server ID, external UE ID, group ID, and so forth) or service ID and/or type to an LCS profile, from an available list of LCS profiles (e.g., may be pre-configured by a location service provider and/or MNO). The mapping may take into account: 1) an application service type (e.g., corresponds to different applications based on a vertical use case); 2) an environment or service area type (e.g., indoor, outdoor, urban, suburban, and so forth); 3) QoS requirements (e.g., accuracy); 4) capabilities of the UEs involved; 5) energy constraints for devices; 6) time validity for a request; 7) service and/or slice profile of an application; 8) preference for certain positioning methods (e.g., RAT-dependent (e.g., 3GPP-based positioning methods) or RAT-independent methods); 9) an LCS service level (e.g., for IIOT verticals); 10) priorities of location methods; and/or 11) a load of location functions involved in the process.

Table 1 illustrates one example of mapping information.

TABLE 1

| App # | Profile ID/name | Vertical/ use case, environment | Positioning Service Level (for IIOT)/ QoS/accuracy | Positioning Method(s)/ Priorities | Involved 3GPP functionalities/ Priorities | Involved non-3gpp access networks | Required APIs/ API info | Other |
|---|---|---|---|---|---|---|---|---|
| #1 | LCS Profile | Industrial scenario, | Service Level 6/cm level | 1. DL time difference of | 1. LMF 2. RAN-LMC | 4. WLAN ID, . . . | NEF APIs, | Verification/ augmentation |

TABLE 1-continued

| App # | Profile ID/name | Vertical/ use case, environment | Positioning Service Level (for IIOT)/ QoS/accuracy | Positioning Method(s)/ Priorities | Involved 3GPP functionalities/ Priorities | Involved non-3gpp access networks | Required APIs/ API info | Other |
|---|---|---|---|---|---|---|---|---|
| | #1 | indoors, mobile robots/ AGVs | accuracy/ absolute/ relative/both | arrival ("TDOA") 2. UL-TDOA 3. Multi-RTT methods 4. WLAN 5. motion sensors 6. bluetooth | 3. SEAL LMS | 5. MEC platform capability #x | MEC APIs, . . . | required |
| #2 | LCS Profile #2 | V2X, outdoor, . . . | Decimeter level accuracy/ . . . absolute/ relative/both | 1. DL-TDOA 2. Multi round trip time ("RTT") methods 3. GNSS-RTK 4. Sensor fusion 5. A-GPS | 1. LMF 2. SEAL LMS 3. Other UEs | 3. GNSS #x, #y 4. MEC #x | NEF APIs, MEC APIs, . . . | Support for sidelink positioning |

In an options second communication 414, there may be configuration of LCS producers with required positioning methods per a LCS profile and the mapping to an application (e.g., to know the capabilities and/or permissions). This may include the configuration of a LMF, RAN-LMC, UE-LCS, and/or SEAL location management component ("LMC") with the information about what method to use and with which priority.

In a third communication 416, the LSE 406 (e.g., based on the application LCS profile) sends a location request and/or subscription to one or more of 3GPP defined functions (e.g., based on the needed location methods): 1) an application of a UE (or of a group of UEs, based on the profile)—this may be an LSE client activated at the UE side-such a request may include additional data like UE mobility, route, and so forth; 2) LMF via a network exposure function ("NEF") or via GMLC and/or location retrieval function ("LRF"); 3) RAN and/or RAN LCS-LSE may request this indirectly via a UE modem (e.g., LSE to LCS UE to RAN); and/or 4) SEAL location management server ("LMS") via a SEAL API (e.g., LSE acting as VAL server).

In a fourth communication 418, the LSE 406 receives a location response and/or reports based on the requests: 1) an application of the UE (or of a group of UEs, based on the profile); 2) LMF; 3) RAN and/or RAN LCS-RAN may provide this indirectly via the UE modem (e.g., RAN-to-LCS UE-to LSE client-to LSE server); and/or 4) SEAL LMS.

The LSE 406 may request from all the functions at the same time, or sequentially and conditionally on whether a requirement is fulfilled. The LSE 406 may check 420 after every reception of the report and decides whether to perform further requests. The LSE 406 may start from the function with the highest priority and continues in descending order. The LSE 406 may perform positioning estimate processing and may determine additional inputs and/or processing based on the LCS profile The LSE 406 checks 422 if the LCS requirements (e.g., QoS requirements) are achieved and evaluates whether further action is needed. In particular, such further action may be one of the following: 1) request location reports from non-3GPP systems, or application server and/or clients (e.g., based on the LCS profile) (e.g., from wireless local area network ("WLAN"), global navigation satellite system ("GNSS"), etc. via GPS, Bluetooth, motion sensors, and so forth); 2) location verification via multiple sources (e.g., this may be useful in UAS scenarios if an unmanned aerial vehicle ("UAV") reported location cannot be trusted); 3) location augmentation (e.g., with 3D live maps, etc.); 4) check location for all and/or additional UEs within the area and/or proximity (e.g., since the expected location of the UE may be correlated with other UEs in the area) (e.g., UEs located in a rectangular grid such as a zone); 5) use analytics and/or historical data to increase precision; 6) take input for a location of the target UE from other UEs in the area; and/or 7) group based positioning.

In an optional fifth communication 424, an optional sixth communication 426, an optional seventh communication 428, and an optional ninth communication 430, if the action requires information from location reports, the LSE 406 requests and/or receives location reports and/or supplementary information form one or more of: an app of the UE, a RAN, a LMF, a SEAL, and/or non-3GPP systems.

The LSE 406 computes 432 a location estimate (e.g., actual location, expected location, estimated location) of the UEs of the application and sends the location information to a vertical application server in a tenth communication 434. This may be a one-time event or may happen periodically and/or based on a trigger event.

Steps 436 through 442 describe a trigger event and a procedure for adaptation.

In an eleventh communication 436, the LSE 406 may monitor an app #1 location (e.g., along a route), and may trigger the update of the mapping of app #a to LCS profile, if the location QoS cannot be fulfilled, if the service profile mapping changes, if the location and/or mobility of the UE changes, or if it is expected for the application to be relocated to a different data network ("DN") name ("DNN") or slice.

If the trigger comes from the application, the LSE 406 receives an application to service profile remapping, or an expected change of application requirements (e.g., location accuracy and/or QoS). If the trigger comes from monitoring, a monitoring capability at the LSE is needed and triggers 438 an action, which is the adaptation of an attribute (e.g., a UE moving from outdoors to a tunnel).

In a twelfth communication 440, the LSE 406 repeats steps 412 through 434 to update the LCS profile and the inbound reporting to ensure location requirements are met (e.g., update remapping).

One example of updated mapping is shown in Table 2 with crossed out elements being removed from the profile and other elements being added.

TABLE 2

| App # | Profile ID/name | Vertical/ use case, environment | Positioning Service Level (for IIOT)/ QoS/accuracy | Positioning Method(s)/ Priorities | Involved 3GPP functionalities/ Priorities | Involved non-3gpp access networks |
|---|---|---|---|---|---|---|
| #1 | LCS Profile #1 → LCS Profile #3 (new) | Industrial scenario, indoors, mobile robots/ AGVs → outdoors, low mobility (new condition) | Service Level 6/cm level accuracy/ → Decimeter level accuracy/ . . . | 1. DL-TDOA 2. UL-TDOA 3. GNSS-RTK 4. Sensor fusion, →Hybrid positioning (DL-TDOA + GNSS) to increase accuracy | 1. LMF 2.~~RAN LMC~~ 3. SEAL LMS, | ~~4. WLAN,...~~ 5. MEC platform capability #x |

In a thirteenth communication 442, if the change was triggered by the application, the LSE 406 provides a report and/or response to the application denoting the change of the reporting and/or profile.

Certain embodiments include techniques to perform mapping and translation between an LSE server and LSE client located within a VAL UE.

In a first embodiment, there may be LCS profile mapping and translation by an LSE server. In the first embodiment, the LCS profile is configured by and/or to a telecommunications operator and/or provider (e.g., the MNO or cloud provider). An LSE-S may be an enhancement of a SEAL LMS, or a new entity.

Figure 5:
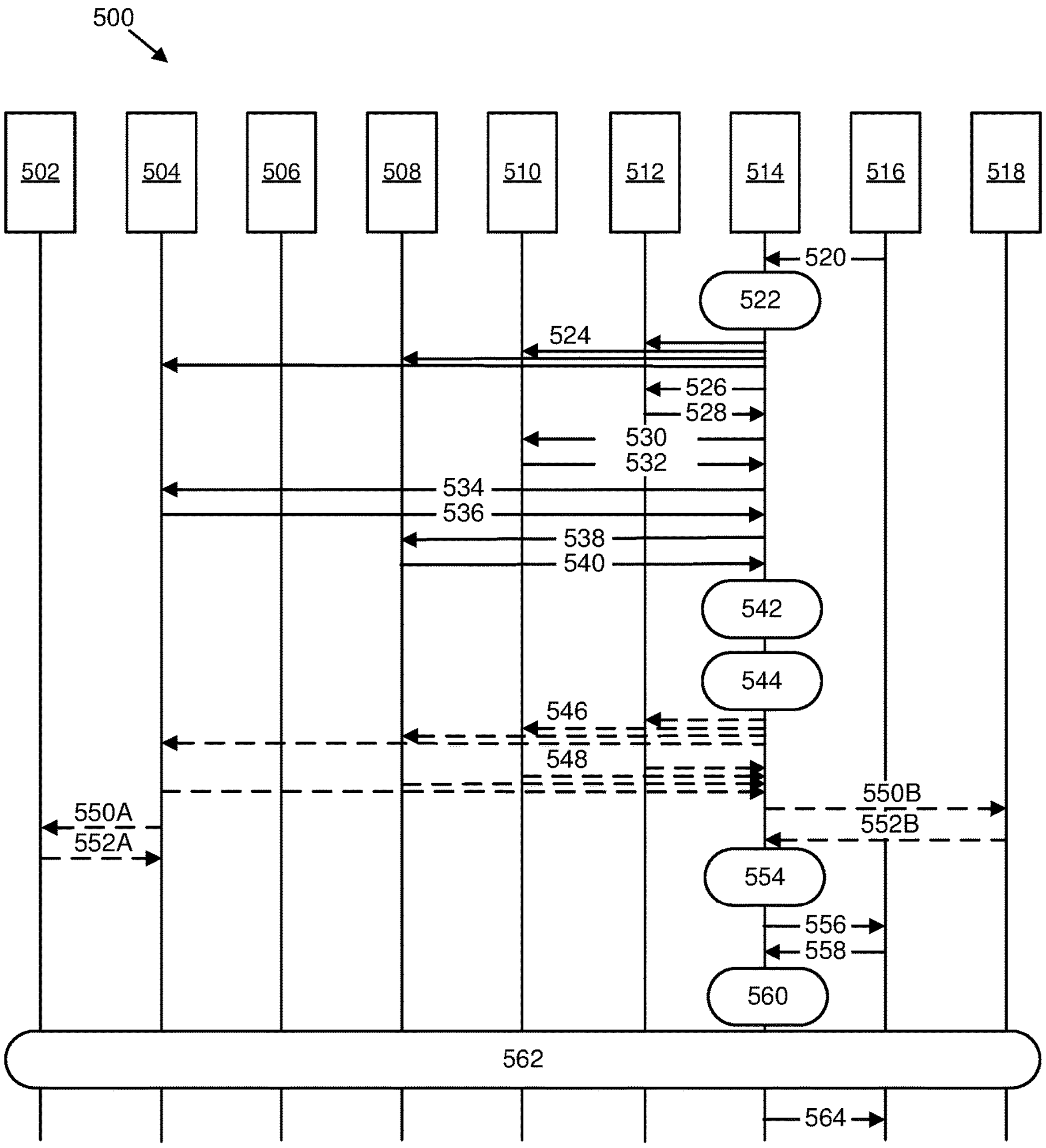
FIG. 5 is a block diagram illustrating another embodiment of a system for application to LCS profile mapping.

FIG. 5 is a block diagram illustrating another embodiment of a system 500 for application to LCS profile mapping. The system 500 includes applications 502 (e.g., connected by GPS, Bluetooth, etc.), an LSE client 504, a UE-LCS client 506, a RAN 508, a LMF 510 (e.g., fifth generation core ("5GC") LMF, global location management system ("GLMS")), a SEAL LMS 512, an LSE server 514 ("LSE-S"), a VAL server 516, and a non-3GPP access network 518 (e.g., trusted, untrusted). The applications 502, the LSE client 504, and the UE-LCS client 506 may all be part of a VAL UE. As may be appreciated, any of the communications described herein may include one or more messages.

In a first communication 520, a location request message may be sent from the VAL server 516 to the LSE server 514. The location request message may include: a VAL server ID, an application ID, an application type, location QoS requirements (e.g., accuracy, response time, etc.), location granularity (e.g., coordinates, cell-level, civic addresses, topological location), vertical specific support information (e.g., planned route, road maps, etc.), time validity for the requirement, area of validity, predictive location service, service profile, device capabilities (e.g., GPS receivers, supported radio access technologies ("RATs"), supported positioning methods), power constraints, time expiration for the request, minimum time between consecutive reports, and/or event triggering criteria (e.g., under which criteria the location report needs to be sent).

The LSE-S 514 performs 522 mapping of an application (e.g., based on the IDs received in step 520) to a LCS profile.

The LCS profile (or profiles) include one or more of the following attributes: vertical, use case, environment, positioning service level (e.g., for IIoT), LCS QoS parameters and/or accuracy, positioning methods supported, priorities and/or preferences of positioning methods, involved 3GPP functionalities and priorities, involved non-3GPP access networks (e.g., trusted, untrusted), required APIS and/or API info, a location verification flag, a location augmentation flag, and/or a group-based positioning flag.

The mapping may take into account: 1) an application service type; 2) an environment (e.g., indoor, outdoor, urban, suburban, and so forth); 3) QoS requirements (e.g., accuracy); 4) capabilities of the UEs involved; 5) energy constraints for devices; 6) time validity for a request; 7) service and/or slice profile of an application; 8) preference for certain positioning methods (e.g., RAT-dependent or RAT-independent methods); 9) an LCS service level (e.g., for IIOT verticals); 10) priorities of location methods; and/or 11) a load of location functions involved in the process.

One example method for mapping the application to LCS profile is the matching of the context information received at step 520 with the attributes of the LCS profile, and to further check the load of LCS profiles (e.g., the load that LCS profiles have an impact on the load of respective location service providing functions). The mapping policies (e.g., based on application type) may be preconfigured based on a vertical and/or an OAM.

In a second communication 524 (e.g., set of communications from the LSE-S 514), the LSE-S 514 configures the involved 3GPP functions and the application enabler client at the UE for the mapping of the application to an LCS profile and the configuration of the reporting corresponding to the LCS profile of the application. The configuration may include at least one of following parameters: 1) a UE ID, a list of UE IDs, a group ID, a service ID, a VAL server ID, and/or an application type; 2) a mapping of app #1 to LCS profile #x (e.g., this can also be a sequence of mappings for the app #1, such as along the UE route); 3) a report configuration (e.g., thresholds for event triggering, periodicity of reporting, format of reporting, minimum time between consecutive reports); 4) priority of positioning methods; 5) location report granularity (e.g., coordinates, cell-level, civic addresses, topological location); 6) LCS profile attributes (e.g., if not known already by the involved entity); and/or 7) time validity and/or area of validity for the configuration. In some embodiments, step 524 may occur before step 520 (e.g., at a time that the application registers with the LSE-S 514).

In a third communication 526, 530, 534, and 538, the LSE-S 514 performs a location request to one or more of the following: 1) to SEAL LMS, acting as VAL server, to request the location information for one or more UEs (e.g., VAL triggered location reporting trigger)—such reporting trigger may also be enhanced to indicate the LCS profile ID and to indicate the locations of all the UEs with this LCS profile in this area; 2) to LMF and/or gateway mobile location center ("GMLC") directly or via NEF acting as AF—the LCS service request is sent to GMLC and/or LMF or AMF via NEF using the service-based interface or common API framework ("CAPIF") API, or directly to GMLC if allowed to (e.g., LSE-S within MNO trust domain); 3) to RAN and/or RAN-LMC—this request may be sent to a RAN function which computes the location for one or more UEs-such request may include the app ID, location QoS requirements (e.g., absolute and relative horizontal and vertical accuracies, response time), positioning methods and priorities related to positioning methods and associated positioning measurements, request for location information for all UEs with the same profile, number of positioning fixes of a particular UE, integrity of the positioning estimate such as confidence interval, alert limits, time-to-alert, target and integrity risk; 4) to the application of the UE (e.g., LSE-S, server enabler application layer ("SEAL") client ("C") ("SEAL-C"))—this request may be similar to a location information request and may be enhanced to include the LCS profile ID (e.g., if the app to profile mapping is not sent in step 524) as well as the request for location reporting for other UEs in proximity within the same service and/or profile; and/or 5) to a MEC platform via invoking a location API—this request may be enhanced to include the LCS profile ID and configuration information (e.g., if MEC capability is not aware of the profiles).

In a fourth communication 528, 532, 536, and 540, the LSE-S 514 receives a location response (e.g., including a location report) from the requested entities in step 526, which provides the location information and/or estimate based on a requested granularity (e.g., coordinates, cell level, civic address, etc.), a timestamp, a triggering event (e.g., if the request is about sending a location report only in case of an event), whether it is an actual or predicted location of UEs, and/or an associated confidence interval or related metric indicating the reliability of the provided location estimate.

The LSE-S 514 performs 542 location report processing and checks whether the received location information fulfils the LCS profile requirement (e.g., based on QoS parameters such as accuracy and/or response time). If the information fulfils the requirements, the method moves to step 554.

If the information does not fulfil the requirement, the LSE-S 514 performs 544 further processing based on the received location reports and the context received in step 520, and checks again the fused location estimate. The further processing may include one or more of the following: 1) location augmentation (e.g., with 3D live maps and so forth); 2) use of analytics and/or historical data to increase precision; and/or 3) UE and/or group UE mobility information.

In an optional fifth communication 546, if steps 542 and 544 do not provide the required LCS (or the LSE-S 514 doesn't have up to date information on the application context), the LSE-S 516 requests supplementary information related to the UE positioning from one or more 3GPP entities as the SEAL LMS and/or LMC, LMF and/or AMF, network data analytics function ("NWDAF"), LSE-Client at the UE, or from a MEC platform via a MEC API.

In an optional sixth communication 548, the LSE-S 514 receives the supplementary information based on the request. The information may include: actual and/or predicted UE mobility, location for all and/or additional UEs within the area and/or proximity, a UE location by other sources for location verification (e.g., may be used for UAS related profiles), a high definition ("HD") map for a particular area, an augmented location, a relative location between UEs within the application (e.g. between drone and pilot, between vehicles in platoon), a location request to one UE to be provided on behalf of others (e.g., group lead to collect and send the other UE locations).

In an optional seventh communication 550A, in an optional eighth communication 550B, in an optional ninth communication 552A, and in an optional tenth communication 552B, the LSE-S 514 checks the fulfilment of the LCS profile requirements for the application. If the requirements are not met, the LSE-S 514 and/or the LSE client 504 requests non-3GPP domains to provide such information and receive location information. This can be via one or more of three ways: 1) as indicated in UE assisted and UE based positioning procedure via N3IWF, TNGF, and/or wireless access gateway function ("W-AGF") or via an application layer (e.g., interface out of 3GPP scope)—when interacting with a N3GPP access network, reported location information depends on whether it is trusted or not-such information may include the UE local internet protocol ("IP") address or UE and/or N5CW device local IP address, in the case of WLAN access, basic service set identifier ("BSSID") of the attached AP or BSSID of a detected AP, and/or a civic address and/or geospatial location information; 2) as a network assisted positioning procedure, via N3IWF, TNGF, and/or W-AGF or via an application layer (e.g., interface out of 3GPP scope)—this information may be the UE and/or N5CW device local IP address and optionally user datagram protocol ("UDP") or transmission control protocol ("TCP") source port, and a trusted non-3GPP access point ("TNAP") and/or trusted WLAN access proxy ("TWAP") ID (e.g., for trusted devices); and/or 3) via SEAL LMC and/or LSE-client to an indirectly request of the UE location information (e.g., from a global positioning system ("GPS") receiver, a Bluetooth receiver, and so forth).

The LSE-S 514 calculates 554 a fused location estimate based on the previous steps, and checks whether the requested location QoS (e.g., based on the LCS profile) is fulfilled.

In an eleventh communication 556, the LSE-S 514 reports the location information to the VAL server 516.

Figure 6:
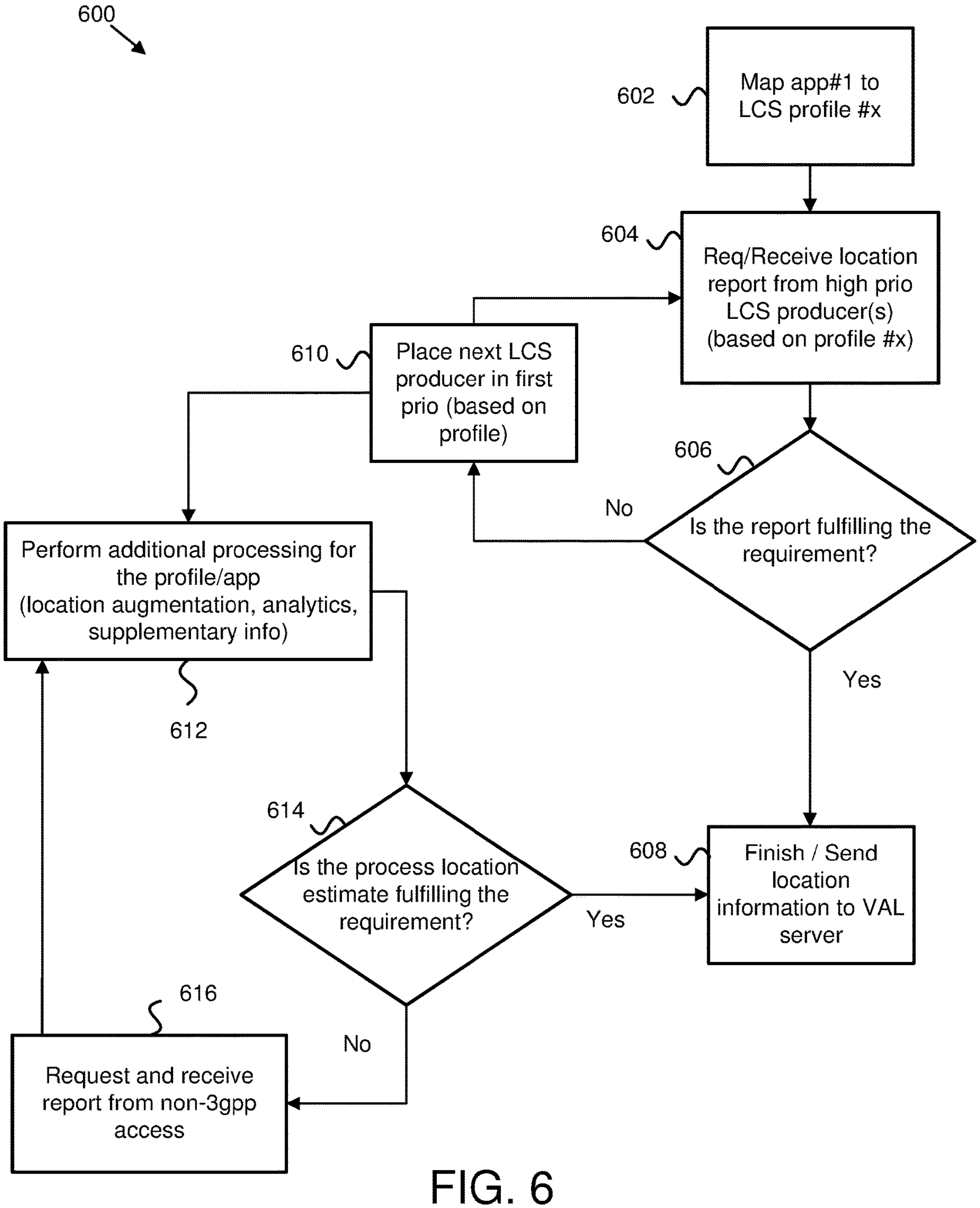
FIG. 6 is a flow chart diagram illustrating one embodiment of a method for requirement verification.

One possible flow chart for the procedure described in FIG. 5 is illustrated in FIG. 6 and described herein.

In steps 558 through 564, an event, which can be provided by the application-side, by the network, by the OAM and/or by the UE, may trigger a re-mapping of the application to a different LCS profile. This trigger event may result from a change of environment (e.g., indoor to outdoor), a change of a service profile for an application (e.g., change of service operation level), a location service profile availability change in a target area, a location service profile area change, or a mobility event that may require the application relocation to a different DN and/or slice. In certain embodiments, if there is a mismatch between an application requirement for LCS, and an LCS profile, an LSE server may be able to adapt a mapping to facilitate meeting location QoS requirements.

If the trigger comes from the OAM, the trigger may affect the re-mapping of all applications to different LCS profiles in a target geographical or topological area (e.g., cell area, tracking area) or slice instance.

In a twelfth communication 558, the LSE-S 514 may monitor an app #1 location (e.g., along the route), and may trigger the update of the mapping of app #a to LCS profile if the location QoS cannot be fulfilled, if the service profile mapping changes, if the location and/or mobility of the UE changes, or if it is expected that the application is to be relocated to a different DNN or slice. If the trigger comes from the application, the LSE-S 514 receives an application to service profile remapping, or an expected change of application requirements (e.g., location accuracy and/or QoS).

If the trigger comes from monitoring, a monitoring capability at the LSE-S 514 may be needed and may trigger 560 an action, which may be an adaptation of an attribute (e.g., a UE moving from outdoors to a tunnel).

In a thirteenth communication 562, the LSE-S 514 may repeat steps 522 through 556 to update the LCS profile and the inbound reporting to facilitate location requirements being met.

In a fourteenth communication 564, if the change was triggered by the application, the LSE-S 514 provides a report and/or response to the application denoting the change of the reporting and/or the profile.

FIG. 6 is a flow chart diagram illustrating one embodiment a method 600 for requirement verification. The method 600 includes mapping 602 an application (e.g., app #1) to an LCS profile (e.g., LCS profile #x). The method 600 further includes requesting 604 and/or receiving a location report from high priority LCS producers (e.g., based on profile #x). The method 600 includes determining 606 whether the report fulfills requirements (e.g., QoS requirements). If the report does fulfill the requirements, the method 600 includes finishing 608 and/or sending location information to a VAL server. If the report does not fulfill the requirements, the method 600 includes placing 610 a next LCS producer in a first priority position (e.g., based on profile #x). The method 600 then returns to step 604 until there are no more LCS producers and/or a time threshold is reached.

If there are no more LCS producers and/or the time threshold is reached, the method 600 performs 612 additional processing for the profile and/or application (e.g., using location augmentation, analytics, and/or supplementary information). The method 600 determines 614 whether the process location estimate fulfills the requirement. If the process location estimate does fulfill the requirement, the method 600 performs step 608. If the process location estimate does not fulfill the requirement, the method 600 requests 616 and receives a report from non-3GPP access points and returns to step 612.

In a second embodiment, LCS profile mapping may be performed by an LSE client (e.g., at the device side based on an LSE server configuration-LSE client residing at a VAL UE).

Figure 7:
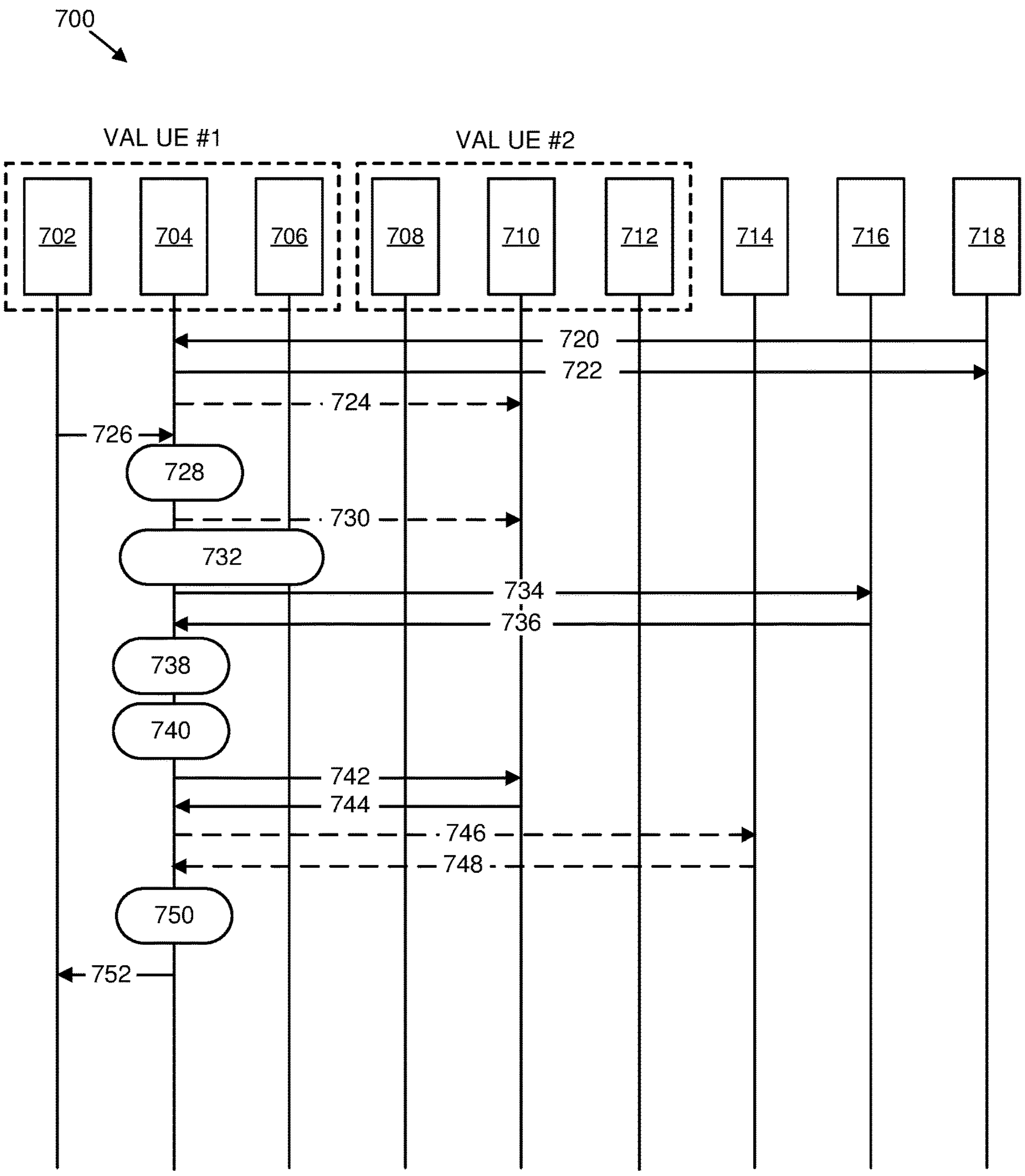
FIG. 7 is a block diagram illustrating a further embodiment of a system for application to LCS profile mapping.

FIG. 7 is a block diagram illustrating a further embodiment of a system 700 for application to LCS profile mapping. The system 700 includes a first VAL UE (e.g., VAL UE #1) that includes a first application 702 (e.g., app #1), a first LSE client 704 (e.g., and/or SEAL LMC), and a first UE-LCS client 706. The system 700 also includes a second VAL UE (e.g., VAL UE #2) that includes a second application 708 (e.g., app #2), a second LSE client 710, and a second UE-LCS client 712. The system 700 includes a non-3GPP access network 714, a RAN 716 (e.g., or CN, SEAL, MEC), and an LSE server 718 (LSE-S). As may be appreciated, any of the communications described herein may include one or more messages.

In a first communication 720 and in a second communication 722, the LSE-S 718 configures the LSE clients at the UEs side for the mapping of the applications to an LCS profile and the configuration of the reporting corresponding to the LCS profile of the applications. The configuration may be in the form of a request and may include at least one of following parameters: 1) a UE ID, a list of UE IDs, a group ID, a service ID, a VAL server ID, and/or application type; 2) a pre-determined mapping of app #1 to LCS profile #x (e.g., this may be a sequence of mappings for the app #1, such as along the UE route); 3) a report configuration (e.g., thresholds for event triggering, periodicity of reporting, format of reporting, minimum time between consecutive reports); 4) priority of positioning methods; 5) a location report granularity (e.g., coordinates, cell-level, civic addresses, topological location); 6) LCS profile attributes (e.g., if not known already by the involved entity); and/or 7) a time validity and/or an area of validity for the configuration. Then, the LSE client may send back a response message to notify about the success of the configuration (e.g., acknowledgement ("ACK") and/or negative acknowledgement ("NACK")).

In an optional third communication 724, the first LSE client 704 configures the LSE profiles of other UEs and/or LSE clients within the service and/or application, in proximity, and/or within the same group.

In a fourth communication 726, a location request message is sent from the first application 702 at the UE to the first LSE client 704 and includes one or more of: an application ID, an application type, location QoS requirements (e.g., accuracy, response time, and so forth), a location granularity (e.g., coordinates, cell-level, civic addresses, topological location), vertical specific support information (e.g., planned route, road maps, and so forth), a time validity for the requirement, an area of validity, a predictive location service, a service profile, device capabilities (e.g., GPS receivers, supported RATs, supported positioning methods), power constraints, a time expiration for the request, a minimum time between consecutive reports, and/or event triggering criteria (e.g., under which criteria the location report needs to be sent).

The first LSE client 704 performs 728 the mapping of the application (e.g., based on the IDs received in steps 720 and 722) to an LCS profile.

LCS profiles include one or more of the following attributes: vertical, use case, environment, positioning Service Level (e.g., for IIOT), LCS QoS parameters and/or accuracy, positioning methods supported, priorities and/or preference of positioning methods, location estimate integrity and reliability, involved 3GPP functionalities and priorities, involved non-3GPP access networks (e.g., trusted, untrusted), required APIS and/or API information, a location verification flag, a location augmentation flag, and/or a group-based positioning flag.

The mapping may take into account: 1) an application service type; 2) an environment (e.g., indoor, outdoor, urban, suburban, and so forth); 3) QoS requirements (e.g., accuracy); 4) capabilities of the UEs involved; 5) energy constraints for devices; 6) time validity for a request; 7) service and/or slice profile of an application; 8) preference for certain positioning methods (e.g., RAT-dependent or RAT-independent methods); 9) an LCS service level (e.g., for IIOT verticals); 10) priorities of location methods; and/or 11) a load of location functions involved in the process.

One example method for mapping the application to LCS profile is the matching of the context information received at step 726 with the most attributes of the LCS profile, and to further check the load of LCS profiles (e.g., the load of LCS profiles have an impact on the load of respective location service providing functions). The mapping policies (e.g., based on application type) may be preconfigured based on a vertical and/or an OAM.

In a fifth communication 730, the second LSE client ("LSE-C") 704 may send the mapping of the application (e.g., based on the IDs received in steps 720 through 724) to an LCS profile to the other UEs and/or LSE clients within the service and/or application, in proximity, and/or within the same group (e.g., which were configured with the LSE profiles in 724).

In a sixth communication 732, if the VAL UE #1 has an LCS client, it may also fetch the location information locally from the first UE-LCS client 706 (e.g., it may be up to implementation about how this is received at the first LSE-C 704).

In a seventh communication 734, the first LSE-C 704 performs a location request to one or more of the following: 1) to LMF and/or GMLC via AF and via NEF—the LCS service request is sent to NEF via AF (e.g., SEAL LMS and/or LSE-S) and from AF to GMLC and/or LMF or AMF, via NEF using the service based interface or CAPIF API, or directly to GMLC if allowed to; 2) to a RAN—this request may be sent to a RAN function which computes the location for one or more UEs-such request may include the application ID, location QoS requirements (e.g., absolute and relative horizontal and vertical accuracies, response time), positioning methods and priorities related to positioning methods and associated positioning measurements, request for location information for all UEs with the same profile, number of positioning fixes of a particular UE, integrity of the positioning estimate, confidence interval, alert limits, time-to-alert, and/or target and integrity risk; 3) to the application of the UE—this request may be similar to location information request and may be enhanced to include the LCS profile ID (e.g., if the application to profile mapping is not sent in step 726) as well as the request for location reporting for other UEs in proximity within the same service and/or profile; and/or 4) to a MEC platform via invoking a location API (e.g., from LSE client to MEC location service)—this request may be enhanced to include the LCS profile ID and configuration info (e.g., if MEC capability is not aware of the profiles).

In an eighth communication 736, the first LSE-C 704 receives a location response (e.g., including a location report) from the requested entities in step 736, which provides the location information and/or estimate based on the requested granularity (e.g., coordinates, cell level, civic address, etc.), a timestamp, the triggering event (e.g., if the request is about sending a location report only in case of an event), whether it is actual or predicted location of the UEs, and an associated confidence interval or related metric indicating the reliability of the provided location estimate.

The first LSE-C 704 checks 738 whether the received location information fulfils the LCS profile requirement (e.g., based on QoS parameters such as accuracy and/or response time). If the requirements are fulfilled, go to step 752.

If the requirements are not fulfilled, the first LSE-C 704 performs 740 further processing based on the received location reports and context received in steps 720-724; and checks the fused location estimate. The processing may include: 1) using location augmentation such as with 3D live maps; 2) using analytics and/or historical data to increase precision; and/or 3) UE and/or group UE mobility information.

In a ninth communication 742, if steps 738 and 740 don't provide the required LCS (or LSE-C doesn't have up to date information on the application context), the first LSE-C 704 requests supplementary information related to the UE positioning from all and/or additional UEs within the area and/or proximity of the UE via a groupcast and/or broadcast message to all users within the LCS profile or at a given area.

In a tenth communication 744, the first LSE-C 704 receives the supplementary information based on the request.

In an optional eleventh communication 746 and an optional twelfth communication 748, the first LSE-C 704 checks again the fulfilment of the LCS profile requirements for the application. If the profile requirements are not met, the first LSE-C 704 requests non-3gpp access networks (e.g., WLAN) to provide such information and receive location information. If interacting with an N3GPP access network, the reported location information depends on whether it is trusted or not. Such information may be the UE local IP address or UE and/or non 5G compatible over WLAN ("N5CW") device local IP address, in the case of WLAN access, BSSID of the attached AP or BSSID of detected AP, civic address and/or geospatial location information.

The first LSE-C 704 calculates 750 the fused location estimate based on the previous steps, and check whether the requested location QoS (e.g., based on the profile) is fulfilled In a thirteenth communication 752, the first LSE-C 704 reports the location information to the first application 702.

In a third embodiment, LSE functionality may enhance functionality (or new service) of a LMF and/or GMLC based on the deployment at the network side.

Figure 8:
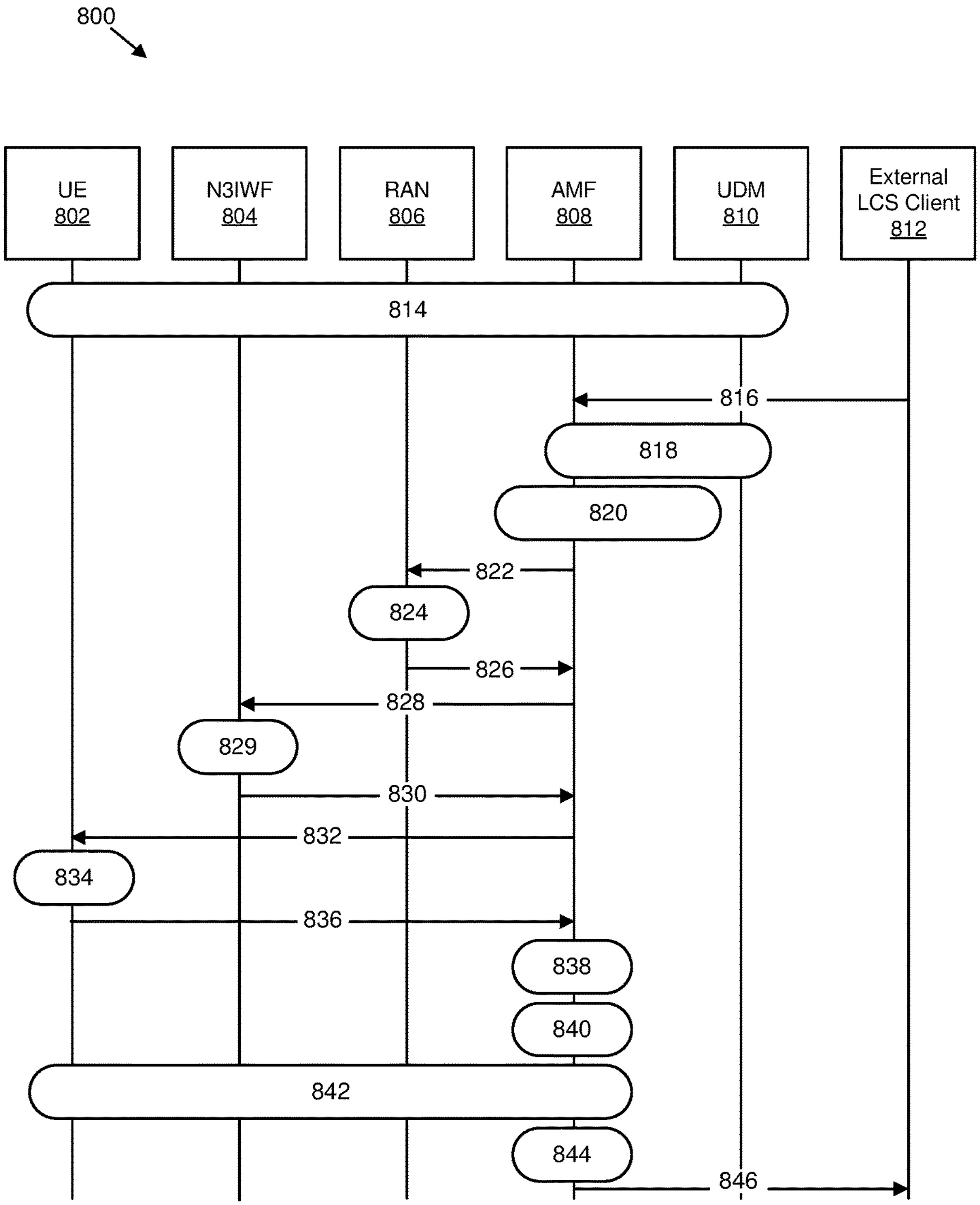
FIG. 8 is a block diagram illustrating another embodiment of a system for application to LCS profile mapping.

FIG. 8 is a block diagram illustrating another embodiment of a system 800 for application to LCS profile mapping. The system 800 includes a UE 802, a non 3GPP inter working function ("N3IWF") 804 (e.g., and/or TNGF and/or W-AGF), a RAN 806, an AMF 808 (e.g., and/or GMLC and/or LMF and/or LSE functionality), a UDM 810, and an external LCS client 812 (e.g., AF, application). As may be appreciated, any of the communications described herein may include one or more messages.

In a first communication 814, there may be an LCS profile configuration.

In a second communication 816, a location request (e.g., including a subscription for location events) comes for from the external LCS client 812. The AMF 808 may receive contexts and/or measurements that are non-UE associated and may support location augmentations.

In a third communication 818, the AMF 808 retrieves from the UDM 810 the application to LCS profile mapping. Here either AMF 808 or UDM 810 keeps a mapping between an application and/or UE and the LCS profile. The LCS profile provides the positioning access type, method, QoS, and so forth.

The AMF 808 configures 820 the reporting required and to which entities to request reports, with which priorities, and so forth. The AMF 808 also takes into account the priorities of different positioning methods based on the LCS profile. The AMF 808 may also take into account a radio resource control ("RRC") state of the UE to configure a positioning method that is energy efficient, which may or may not have an impact on achievable accuracy.

In a fourth communication 822, the AMF 808 sends a location request with the LCS profile ID and/or UE ID to the RAN 806. The fourth communication 822 may be made by the AMF 808 via a network positioning message sent to the serving next generation ("NG") RAN ("NG-RAN") node in an N2 transport message.

The RAN 806 calculates 824 and/or obtains any location information for the profile and/or UE. The RAN 806 returns any location information obtained to the AMF 808 in a fifth communication 826. This may be done via the AMF 808 in a network positioning message included in an N2 transport message (e.g., between the RAN 806 and the AMF 808) and from the AMF 808 to an LSE via a service-based interface.

In a sixth communication 828, the AMF 808 sends a location request with the UE ID and optionally with the LCS profile ID and/or information to the N3IWF 804. This may be made by the AMF 808 via a network positioning message to the serving N3IWF 804.

The N3IWF 804 calculates 829 and/or obtains any location information for the profile and/or UE. In a seventh communication 830, the N3IWF 804 returns any location information obtained to the AMF 808. The reported location information depends on whether it is trusted or not. Such information may be the UE local IP address or UE and/or N5CW device local IP address, in the case of WLAN access, BSSID of the attached AP or BSSID of detected AP, civic address, and/or geospatial location information.

In an eighth communication 832, the AMF 808 sends a location request with the LCS profile ID and/or information to the UE 802 (e.g., via a downlink positioning message to the UE 802 in a DL non-access stratum ("NAS") transport message).

The UE 802 stores 834 any assistance data provided in the downlink positioning message and performs any positioning measurements and/or location computation requested by the downlink positioning message. In a ninth communication 836, the UE 802 sends to the AMF 808 an uplink positioning message included in an NAS transport message (e.g., to acknowledge the downlink positioning message), and to return any location information or return any capabilities, based on the profile.

The AMF 808 checks 838 whether the received location information fulfills the LCS profile requirement (e.g., based on QoS parameters such as accuracy and/or response time).

If the requirements are not fulfilled, the AMF 808 performs 840 further processing based on the received location reports and context received in step 816, and checks again a fused location estimate. Such processing may include: 1) location augmentation using 3D live maps; 2) using analytics and/or historical data to increase precision; and/or 3) UE and/or group UE mobility information.

In a tenth communication 842, if steps 832 through 836 don't provide the required LCS (or LSE doesn't have up to date information on the app context), the AMF 808 requests and receives supplementary information.

The AMF 808 calculates 844 the fused location estimate based on previous steps, and check whether the requested location QoS (e.g., based on the profile) is fulfilled.

In an eleventh communication 846, the AMF 808 reports the location information to the external LCS client 812.

Figure 9:
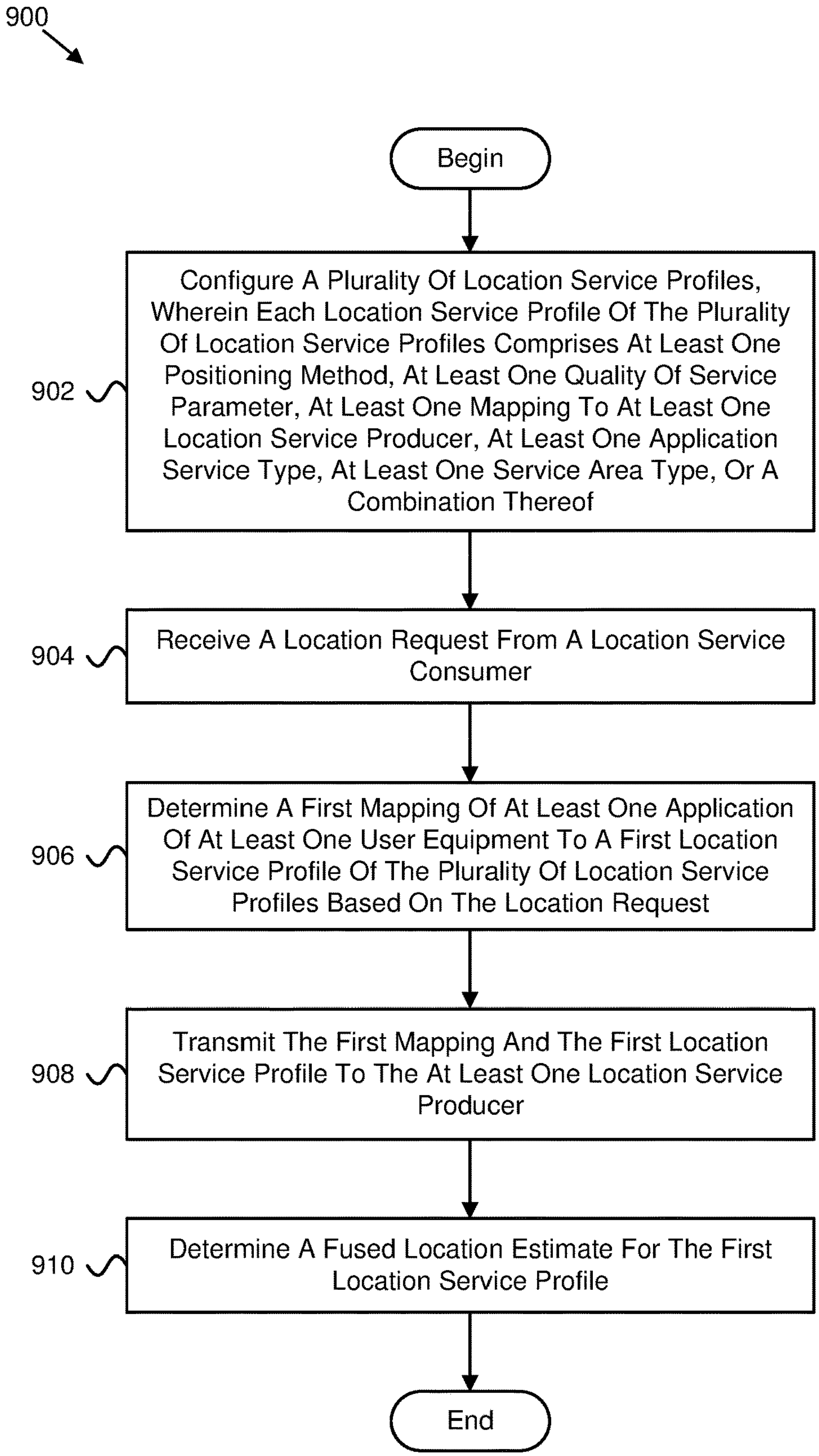
FIG. 9 is a flow chart diagram illustrating one embodiment of a method for mapping applications and location service profiles.

FIG. 9 is a flow chart diagram illustrating one embodiment of a method 900 for mapping applications and location service profiles. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

In various embodiments, the method 900 includes configuring 902 a plurality of location service profiles. Each location service profile of the plurality of location service profiles includes at least one positioning method, at least one quality of service parameter, at least one mapping to at least one location service producer, at least one application service type, at least one service area type, or a combination thereof. In some embodiments, the method 900 includes receiving 904 a location request from a location service consumer. In certain embodiments, the method 900 includes determining 906 a first mapping of at least one application of at least one user equipment to a first location service profile of the plurality of location service profiles based on the location request. In various embodiments, the method 900 includes transmitting 908 the first mapping and the first location service profile to the at least one location service producer. In some embodiments, the method 900 includes determining 910 a fused location estimate for the first location service profile.

In certain embodiments, the method 900 further comprises receiving at least one location report corresponding to the first location service profile, wherein the at least one location report is derived via at least one radio access technology dependent positioning method, at least one radio access technology independent positioning method, or a combination thereof. In some embodiments, the fused location estimate for the first location service profile is determined based on the at least one location report. In various embodiments, the method 900 further comprises transmitting the fused location estimate to the location service consumer.

In one embodiment, the method 900 further comprises determining whether a location quality of service requirement is fulfilled based on the fused location estimate. In certain embodiments, the method 900 further comprises transmitting a request for supplementary information and receiving a response to the request for supplementary information. In some embodiments, the supplementary information comprises actual user equipment mobility information, predicted user equipment mobility information, location information for user equipments within an area, user equipment location information obtained from a secondary source, a map for a particular area, augmented location information, relative location information between user equipments within an application, location request information, or some combination thereof.

In various embodiments, the method 900 further comprises transmitting the fused location estimate to at least one user equipment within a service area, a user equipment group, or a combination thereof. In one embodiment, each location service profile of the plurality of location service profiles comprises application information, user equipment context information, priority information, application programming interface information, a location augmentation requirement, a location prediction requirement, a sidelink positioning assistance requirement, a proximity-based location estimate requirement, a location verification requirement, or some combination thereof. In certain embodiments, the method 900 further comprises transmitting a request for location reporting to the at least one location service producer based on the first location service profile.

In some embodiments, the at least one location service producer comprises a service enabler application layer location management server, a gateway mobile location center, a non-third generation partnership program interworking function, a trusted non-third generation partnership program gateway function, a wireless access gateway function, a mobile edge computing service, a radio access network, a user equipment, or some combination thereof. In various embodiments, the location service consumer comprises a vertical application server, an application function, a vertical enabler server, an application of the user equipment, an application enabler client, an external location service client, a network device, or a combination thereof. In one embodiment, the location service enabler is an application of the user equipment, a middleware application device, a network device, or a combination thereof.

In certain embodiments, the method 900 further comprises: receiving a trigger event from the at least one location service producer, an application entity, or a combination thereof; determining a second mapping of at least application of at least one user equipment to a second location service profile of a plurality of location service profiles based on the first location service profile of the plurality of location service profiles and the trigger event; and transmitting the second mapping and the second location service profile to the at least one location service producer. In some embodiments, the method 900 further comprises receiving at least one additional location report for the second location service profile, wherein the at least one additional location report is derived via at least one radio access technology dependent positioning method, at least one radio access technology independent positioning method, or a combination thereof.

In various embodiments, the method 900 further comprises determining a second fused location estimate for the second location service profile based at least partly on the at least one additional location report. In one embodiment, the method 900 further comprises transmitting the second fused location estimate to the location service consumer.

In one embodiment, a method at a location service enabler comprises: configuring a plurality of location service profiles, wherein each location service profile of the plurality of location service profiles comprises at least one positioning method, at least one quality of service parameter, at least one mapping to at least one location service producer, at least one application service type, at least one service area type, or a combination thereof; receiving a location request from a location service consumer; determining a first mapping of at least one application of at least one user equipment to a first location service profile of the plurality of location service profiles based on the location request; transmitting the first mapping and the first location service profile to the at least one location service producer; and determining a fused location estimate for the first location service profile.

In certain embodiments, the method further comprises receiving at least one location report corresponding to the first location service profile, wherein the at least one location report is derived via at least one radio access technology dependent positioning method, at least one radio access technology independent positioning method, or a combination thereof.

In some embodiments, the fused location estimate for the first location service profile is determined based on the at least one location report.

In various embodiments, the method further comprises transmitting the fused location estimate to the location service consumer.

In one embodiment, the method further comprises determining whether a location quality of service requirement is fulfilled based on the fused location estimate.

In certain embodiments, the method further comprises transmitting a request for supplementary information and receiving a response to the request for supplementary information.

In some embodiments, the supplementary information comprises actual user equipment mobility information, predicted user equipment mobility information, location information for user equipments within an area, user equipment location information obtained from a secondary source, a map for a particular area, augmented location information, relative location information between user equipments within an application, location request information, or some combination thereof.

In various embodiments, the method further comprises transmitting the fused location estimate to at least one user equipment within a service area, a user equipment group, or a combination thereof.

In one embodiment, each location service profile of the plurality of location service profiles comprises application information, user equipment context information, priority information, application programming interface information, a location augmentation requirement, a location prediction requirement, a sidelink positioning assistance requirement, a proximity-based location estimate requirement, a location verification requirement, or some combination thereof.

In certain embodiments, the method further comprises transmitting a request for location reporting to the at least one location service producer based on the first location service profile.

In some embodiments, the at least one location service producer comprises a service enabler application layer location management server, a gateway mobile location center, a non-third generation partnership program interworking function, a trusted non-third generation partnership program gateway function, a wireless access gateway function, a mobile edge computing service, a radio access network, a user equipment, or some combination thereof.

In various embodiments, the location service consumer comprises a vertical application server, an application function, a vertical enabler server, an application of the user equipment, an application enabler client, an external location service client, a network device, or a combination thereof.

In one embodiment, the location service enabler is an application of the user equipment, a middleware application device, a network device, or a combination thereof.

In certain embodiments, the method further comprises: receiving a trigger event from the at least one location service producer, an application entity, or a combination thereof; determining a second mapping of at least application of at least one user equipment to a second location service profile of a plurality of location service profiles based on the first location service profile of the plurality of location service profiles and the trigger event; and transmitting the second mapping and the second location service profile to the at least one location service producer.

In some embodiments, the method further comprises receiving at least one additional location report for the second location service profile, wherein the at least one additional location report is derived via at least one radio access technology dependent positioning method, at least one radio access technology independent positioning method, or a combination thereof.

In various embodiments, the method further comprises determining a second fused location estimate for the second location service profile based at least partly on the at least one additional location report.

In one embodiment, the method further comprises transmitting the second fused location estimate to the location service consumer.

In one embodiment, an apparatus comprises a location service enabler. The apparatus further comprises: a processor that configures a plurality of location service profiles, wherein each location service profile of the plurality of location service profiles comprises at least one positioning method, at least one quality of service parameter, at least one mapping to at least one location service producer, at least one application service type, at least one service area type, or a combination thereof; a receiver that receives a location request from a location service consumer, wherein the processor determines a first mapping of at least one application of at least one user equipment to a first location service profile of the plurality of location service profiles based on the location request; and a transmitter that transmits the first mapping and the first location service profile to the at least one location service producer; wherein the processor determines a fused location estimate for the first location service profile.

In certain embodiments, the receiver receives at least one location report corresponding to the first location service profile, and the at least one location report is derived via at least one radio access technology dependent positioning method, at least one radio access technology independent positioning method, or a combination thereof.

In some embodiments, the fused location estimate for the first location service profile is determined based on the at least one location report.

In various embodiments, the transmitter transmits the fused location estimate to the location service consumer.

In one embodiment, the processor determines whether a location quality of service requirement is fulfilled based on the fused location estimate.

In certain embodiments, the transmitter transmits a request for supplementary information and receiving a response to the request for supplementary information.

In some embodiments, the supplementary information comprises actual user equipment mobility information, predicted user equipment mobility information, location information for user equipments within an area, user equipment location information obtained from a secondary source, a map for a particular area, augmented location information, relative location information between user equipments within an application, location request information, or some combination thereof.

In various embodiments, the transmitter transmits the fused location estimate to at least one user equipment within a service area, a user equipment group, or a combination thereof.

In one embodiment, each location service profile of the plurality of location service profiles comprises application information, user equipment context information, priority information, application programming interface information, a location augmentation requirement, a location prediction requirement, a sidelink positioning assistance requirement, a proximity-based location estimate requirement, a location verification requirement, or some combination thereof.

In certain embodiments, the transmitter transmits a request for location reporting to the at least one location service producer based on the first location service profile.

In some embodiments, the at least one location service producer comprises a service enabler application layer location management server, a gateway mobile location center, a non-third generation partnership program interworking function, a trusted non-third generation partnership program gateway function, a wireless access gateway function, a mobile edge computing service, a radio access network, a user equipment, or some combination thereof.

In various embodiments, the location service consumer comprises a vertical application server, an application function, a vertical enabler server, an application of the user equipment, an application enabler client, an external location service client, a network device, or a combination thereof.

In one embodiment, the location service enabler is an application of the user equipment, a middleware application device, a network device, or a combination thereof.

In certain embodiments: the receiver receives a trigger event from the at least one location service producer, an application entity, or a combination thereof; the processor determines a second mapping of at least application of at least one user equipment to a second location service profile of a plurality of location service profiles based on the first location service profile of the plurality of location service profiles and the trigger event; and the transmitter transmits the second mapping and the second location service profile to the at least one location service producer.

In some embodiments, the receiver receives at least one additional location report for the second location service profile, and the at least one additional location report is derived via at least one radio access technology dependent positioning method, at least one radio access technology independent positioning method, or a combination thereof.

In various embodiments, the processor determines a second fused location estimate for the second location service profile based at least partly on the at least one additional location report.

In one embodiment, the transmitter transmits the second fused location estimate to the location service consumer.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a user equipment (UE), the method comprising:

- configuring a plurality of location service profiles, wherein each location service profile of the plurality of location service profiles comprises at least one positioning method, at least one quality of service (QoS) parameter, at least one mapping to at least one location service producer, at least one application service type, at least one service area type, or a combination thereof;
- receiving a location request from a location service consumer;
- determining a first mapping of at least one application of at least one UE to a first location service profile of the plurality of location service profiles based on the location request;
- transmitting the first mapping and the first location service profile to the at least one location service producer; and
- determining a fused location estimate for the first location service profile.

2. The method of claim 1, further comprising receiving at least one location report corresponding to the first location service profile, wherein the at least one location report is derived via at least one radio access technology dependent positioning method, at least one radio access technology independent positioning method, or a combination thereof, and the fused location estimate for the first location service profile is determined based on the at least one location report.

3. The method of claim 2, further comprising transmitting the fused location estimate to the location service consumer.

4. The method of claim 3, further comprising transmitting a request for supplementary information and receiving a response to the request for supplementary information.

5. The method of claim 4, wherein the supplementary information comprises actual UE mobility information, predicted UE mobility information, location information for UEs within an area, UE location information obtained from a secondary source, a map for a particular area, augmented location information, relative location information between UEs within an application, location request information, or a combination thereof.

6. The method of claim 5, wherein each location service profile of the plurality of location service profiles comprises application information, UE context information, priority information, application programming interface information, a location augmentation requirement, a location prediction requirement, a sidelink positioning assistance requirement, a proximity-based location estimate requirement, a location verification requirement, or a combination thereof.

7. The method of claim 6, further comprising transmitting a request for location reporting to the at least one location service producer based on the first location service profile.

8. The method of claim 7, wherein the at least one location service producer comprises a service enabler application layer location management server, a gateway mobile location center, a non-third generation partnership program interworking function, a trusted non-third generation partnership program gateway function, a wireless access gateway function, a mobile edge computing service, a radio access network, a UE, or a combination thereof.

9. The method of claim 8, wherein the location service consumer comprises a vertical application server, an application function, a vertical enabler server, an application of the UE, an application enabler client, an external location service client, a network device, a remote device, a group of UEs, or a combination thereof.

10. The method of claim 9, wherein the location service enabler is an application of the UE, a middleware application device, a network device, or a combination thereof.

11. The method of claim 10, further comprising:

receiving a trigger event from the at least one location service producer, an application entity, a network entity, or a combination thereof;

determining a second mapping of at least application of at least one UE to a second location service profile of a plurality of location service profiles based on the first location service profile of the plurality of location service profiles and the trigger event; and transmitting the second mapping and the second location service profile to the at least one location service producer.

12. The method of claim 11, further comprising receiving at least one additional location report for the second location service profile, wherein the at least one additional location report is derived via at least one radio access technology dependent positioning method, at least one radio access technology independent positioning method, or a combination thereof.

13. The method of claim 12, further comprising determining a second fused location estimate for the second location service profile based at least partly on the at least one additional location report and transmitting the second fused location estimate to the location service consumer.

14. A user equipment (UE), comprising:

at least one memory; and at least one processor coupled with the at least one memory and configured to cause the UE to:

configure a plurality of location service profiles, wherein each location service profile of the plurality of location service profiles comprises at least one positioning method, at least one quality of service (QoS) parameter, at least one mapping to at least one location service producer, at least one application service type, at least one service area type, or a combination thereof;

receive a location request from a location service consumer, wherein the processor determines a first mapping of at least one application of at least one UE to a first location service profile of the plurality of location service profiles based on the location request; and transmit the first mapping and the first location service profile to the at least one location service producer;

wherein the at least one processor is configured to cause the UE to determine a fused location estimate for the first location service profile.

15. The UE of claim 14, wherein the at least one processor is configured to cause the UE to:

receive a trigger event from the at least one location service producer, an application entity, or a combination thereof;

determine a second mapping of at least application of at least one UE to a second location service profile of a plurality of location service profiles based on the first location service profile of the plurality of location service profiles and the trigger event; and transmit the second mapping and the second location service profile to the at least one location service producer.

16. A processor for wireless communication, comprising:

at least one controller coupled with at least one memory and configured to cause the processor to:

configure a plurality of location service profiles, wherein each location service profile of the plurality of location service profiles comprises at least one positioning method, at least one quality of service (QoS) parameter, at least one mapping to at least one location service producer, at least one application service type, at least one service area type, or a combination thereof;

receive a location request from a location service consumer, wherein the processor determines a first mapping of at least one application of at least one user equipment (UE) to a first location service profile of the plurality of location service profiles based on the location request; and transmit the first mapping and the first location service profile to the at least one location service producer;

wherein the at least one controller is configured to cause the UE to determine a fused location estimate for the first location service profile.

17. The processor of claim 16, wherein the at least one controller is configured to cause the processor to receive at least one location report corresponding to the first location service profile, wherein the at least one location report is derived via at least one radio access technology dependent positioning method, at least one radio access technology independent positioning method, or a combination thereof, and the fused location estimate for the first location service profile is determined based on the at least one location report.

18. The processor of claim 17, wherein the at least one controller is configured to cause the processor to transmit the fused location estimate to the location service consumer.

19. The processor of claim 18, wherein the at least one controller is configured to cause the processor to transmit a request for supplementary information and receive a response to the request for supplementary information.

20. The processor of claim 19, wherein the supplementary information comprises actual UE mobility information, predicted UE mobility information, location information for UEs within an area, UE location information obtained from a secondary source, a map for a particular area, augmented location information, relative location information between UEs within an application, location request information, or a combination thereof.

* * * * *